United States Patent [19]
Fossum

[11] Patent Number: 5,220,646
[45] Date of Patent: Jun. 15, 1993

[54] SINGLE PASS HIDDEN LINE REMOVAL USING Z-BUFFERS

[75] Inventor: Gordon C. Fossum, Austin, Tex.

[73] Assignee: International Business Machines Corporation, Armonk, N.Y.

[21] Appl. No.: 516,615

[22] Filed: Apr. 30, 1990

[51] Int. Cl.[5] .................................. G06F 15/72
[52] U.S. Cl. ................................ 395/122; 395/131
[58] Field of Search ............... 395/122, 131, 141, 164; 340/729, 703

[56] References Cited

U.S. PATENT DOCUMENTS

| | | | |
|---|---|---|---|
| 4,475,104 | 10/1984 | Shen | 395/122 X |
| 4,509,043 | 4/1985 | Mossaides | 340/703 X |
| 4,697,178 | 9/1987 | Heckel | 340/729 |
| 4,812,988 | 3/1989 | Duthuit et al. | 364/522 |
| 4,825,390 | 4/1989 | Van Aken et al. | 395/131 X |
| 4,855,938 | 8/1989 | Gonzalez-Lopez et al. | 364/522 |
| 4,914,607 | 4/1990 | Takanashi et al. | 364/521 |

FOREIGN PATENT DOCUMENTS 64-76373  3/1989  Japan .

OTHER PUBLICATIONS

IBM Technical Disclosure Bulletin, "High Performance Graphics Character Drawing Algorithm" by D. C. Morrill, vol. 31, No. 9, Feb. 1989.

Primary Examiner—Mark K. Zimmerman
Attorney, Agent, or Firm—Mark E. McBurney

[57] ABSTRACT

An improved computer graphics system allows a single pass, or set of operations to draw specific polygons contained within an image being displayed. The computer graphics system includes a multiple bit frame buffer, a write mask which can disable at least two bits of the frame buffer, a z-buffer capable of being turned off and a color map which is loaded with a background, a visible line and a hidden line color. With the z-buffer turned off, and the first bit plane of the frame buffer enabled and the second bit plane of the frame buffer disabled, the hidden line color is selected. The z-buffer is then turned on and with one bit plane disabled and another bit plane enabled, the background color is then selected. The polygon interior is then drawn with the background color, however any pixels corresponding to previously drawn lines will not be painted with the background color because of the disablement of bit plane one. The visible line color is then selected and the polygon being considered is drawn.

10 Claims, 6 Drawing Sheets

| 10      | RED                  | GREEN                  | BLUE                  |
|---------|----------------------|------------------------|-----------------------|
| 0: 0,0  | BACKGROUND RED       | BACKGROUND GREEN       | BACKGROUND BLUE       |
| 1: 0,1  | HIDDEN LINE RED      | HIDDEN LINE GREEN      | HIDDEN LINE BLUE      |
| 2: 1,0  | VISIBLE LINE RED     | VISIBLE LINE GREEN     | VISIBLE LINE BLUE     |
| 3: 1,1  | VISIBLE LINE RED     | VISIBLE LINE GREEN     | VISIBLE LINE BLUE     |

INITIALIZE ALL PIXELS TO - 0, 0

POLYGON 40

| | |
|---|---|
| HIDDEN LINES | PIXELS: 61, 65, 68, 66, 71<br>(0, 0) - (0, 1) |
| BACKGROUND | PIXELS: 62, 70, 48<br>(0, 0) - (0, 0) |
| VISIBLE LINES | PIXELS: 61, 65, 68, 66, 71    PIXELS: 60, 64, 67, 69<br>(0, 1) - (1, 1)                 (0, 0) - (1, 0) |

POLYGON 50

| | |
|---|---|
| HIDDEN LINES | PIXELS: 63, 70    PIXELS: 67    PIXELS: 68<br>(0, 0) - (0, 1)    (1, 0) - (1, 1)    (1, 1) - (1, 1) |
| BACKGROUND | PIXELS: 66    PIXELS: 69    PIXELS: 48<br>(1, 1) - (0, 1)    (1, 0) - (0, 0)    (0, 0) - (0, 0) |
| VISIBLE LINES | PIXELS: 63, 70  PIXELS: 62  PIXELS: 64  PIXELS: 67, 68, 71<br>(0, 1) - (1, 1)  (0, 0) - (1, 0)  (1, 0) - (1, 0)  (1, 1) - (1, 1) |

FIG. 8

SINGLE PASS HIDDEN LINE REMOVAL USING Z-BUFFERS

CROSS REFERENCE TO RELATED APPLICATION

Co-pending U.S. patent application Ser. No. 07/439,902, filed on Nov. 21, 1989, by G. Fossum and having the same assignee as the assignee of the present invention.

BACKGROUND OF THE INVENTION

In a three-dimensional computer graphics image display, it is often desirable to remove lines which are obscured, or hidden from a viewer by an object which is closer to the surface of the display screen. This object may be invisible, as in a wire frame diagram. The line which is considered to be deeper than an obscuring object must be displayed such that the deeper line is either displayed differently, or cannot be seen by a user of the computer graphics system.

Typically, these hidden lines are removed using a multiple pass method, such as is described by U.S. Pat. No. 4,855,938 to Gonzalez-Lopez et al and assigned to IBM Corporation. The first pass of the multiple pass process must be completed for each specific polygon included in the entire image before any successive passes can be performed. Thus, multiple pass processes of hidden line removal require that each polygon within an image (scene) be the subject of multiple operations prior to any polygon being completely rendered, i.e. painted or drawn. A conventional multiple pass method of hidden line removal includes three steps: loading the z-buffer; painting all lines as hidden lines (with hidden line colors); and painting all lines at the same level of the z-buffer as visible lines (with visible line colors).

It can be seen that successively considering each specific polygon in an image at each pass of a multiple step process is an extremely inefficient method which requires three full passes through the data file, which is very expensive if the data is not in memory. Therefore, it would be desirable to have a hidden line removal process which is capable of completely and totally painting, in a single pass, a specific polygon, included within an image to be displayed in a computer graphics system.

SUMMARY OF THE INVENTION

In contrast to the prior art, the present invention provides a structure and method which allows hidden lines to be removed with a single pass through the data. The present invention utilizes a z-buffer and color bit planes to allow a computer program to specify solid foreground colors and solid or patterned background colors, and paint the image with a single pass through the subject process. A two bit frame buffer may be provided as a minimum which allows four colors to be mapped, or written thereto. The subject invention only utilizes three colors (background, hidden line and visible line) which are loaded into a color map. It should be noted that if visible objects are included in the image, more than two bit planes are required.

Broadly, the present invention turns the z-buffer off, (which allows hidden lines to be drawn without obstruction from objects closer to the viewer), and enables the first bit plane and disables the second bit plane by utilizing a frame buffer mask or write mask. The hidden line color (whose index matches the bit selection pattern) is selected and the hidden lines of the current polygon are drawn. The z-buffer is then turned on and bit plane two (BP2) is enabled while bit plane one (BP1) is disabled. The process then selects the background color and fills the current polygon. The visible line color is then selected and the visible lines contained in the polygon (edges) are drawn. Note that these lines may later need to become hidden again, if a later surface obscures them. If any additional polygons remain to be drawn, the present invention continues. However, if the image is completely drawn then the process ends. Consequently, it can be seen how the present invention allows each specific polygon, contained within a particular image displayed on a screen, to be processed by utilizing a single pass.

Therefore, in accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 1:
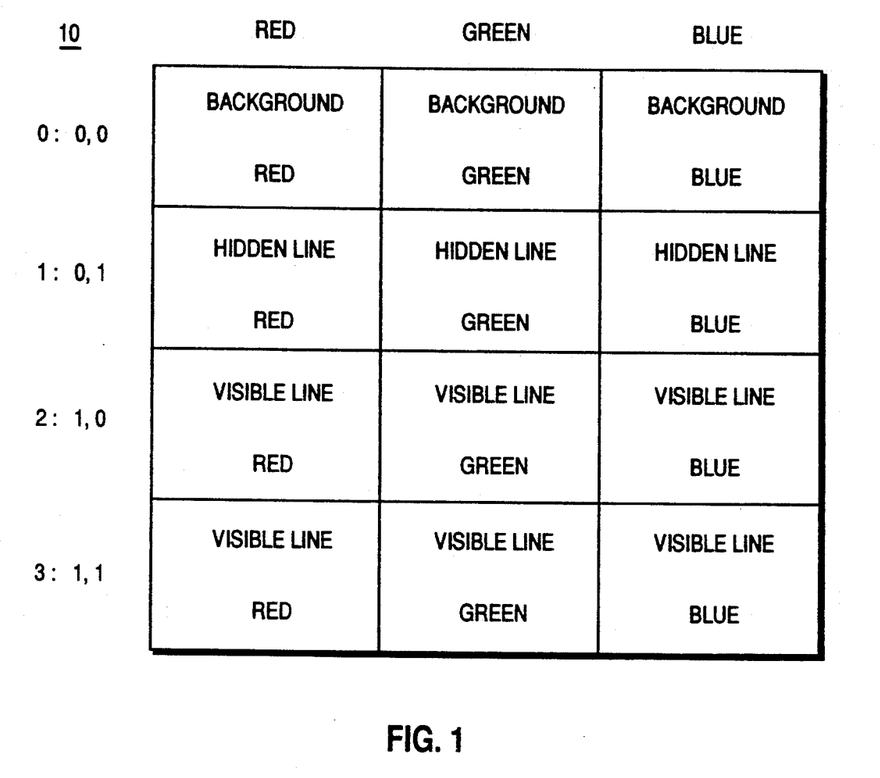
FIG. 1 is a diagram representative of a two bit color map which provides the background, hidden and visible line colors for the two bit plane frame buffer of the present invention.
Figure 6:
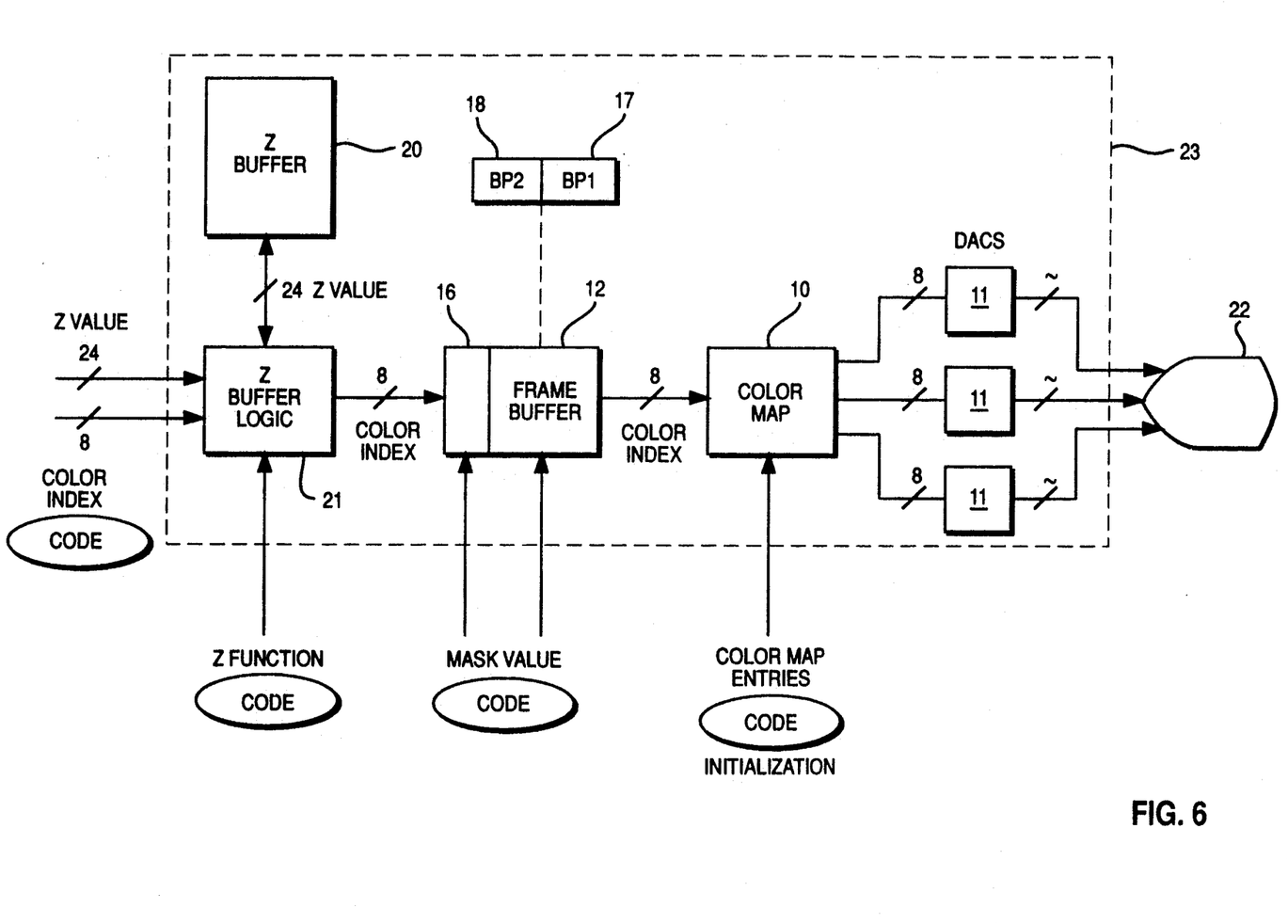

Referring to FIG. 1, a color map 10 is shown having r,g,b values associated with each of the four possible values in the two bit frame buffer 12, including bit planes one and two which correspond to reference numerals 17 and 18, respectively (FIG. 6). Frame buffers 12 are generally a two dimensional representation of each pixel included on a display 22, whereas z-buffer 20 and z-buffer logic 21, provide data about each pixel corresponding to the perceived depth thereof. Typically, z-buffers 20 are 24 bit storage devices capable of storing up to $2^{24}$ bits of data relating to the depth of a line, polygon surface, or the like. Write mask 16 may prevent specific bits of the selected color value from being written into the two bit frame buffer 12, by disabling either bit plane one 17 or bit plane two 18. For the color map 10 of FIG. 1, (0,0) designates the background color (0,1) the hidden line color and both (1,0) and (1,1) correspond to visible line color. The portion of color map 10 corresponding to a "1" value in the most significant bits of bit planes one and two, provided with frame buffer 12 (in the color map of FIG. 1, bits 1,0 and 1,1) need to be loaded with the visible line color. Thus, larger color maps than that depicted in FIG. 1 can be used, so long as 50% of the entries corresponding to the largest binary numbers are loaded with the visible line color.

Figure 5:
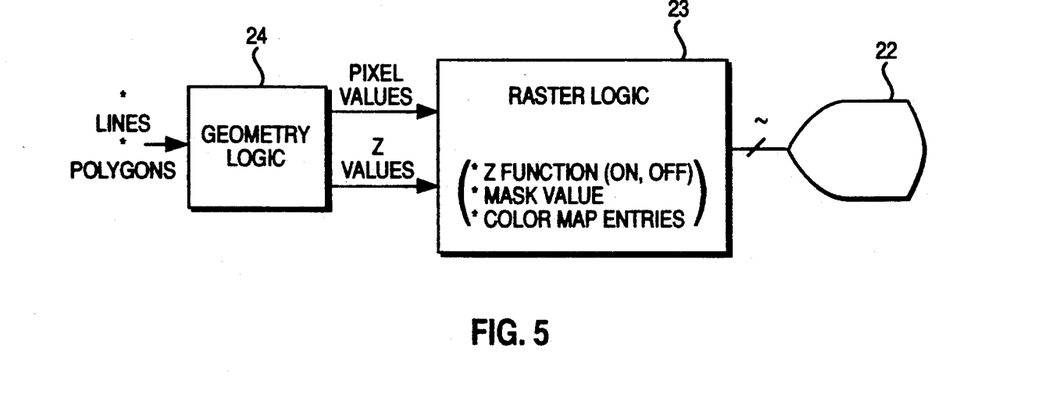
FIGS. 5 and 6 are block diagrams of a system capable of utilizing the present invention.

Color map 10 outputs the processed hidden line, visible line and background colors to digital to analog converters (DAC) 11. The resulting analog signal is then provided to display 22. The elements of FIG. 6, with the exception of display 22, are all included in a raster logic module 23 (FIG. 5). Module 23 receives pixel information and depth (z) information from a geometry logic circuit 24, which had previously processed line and polygon information.

Figure 2:
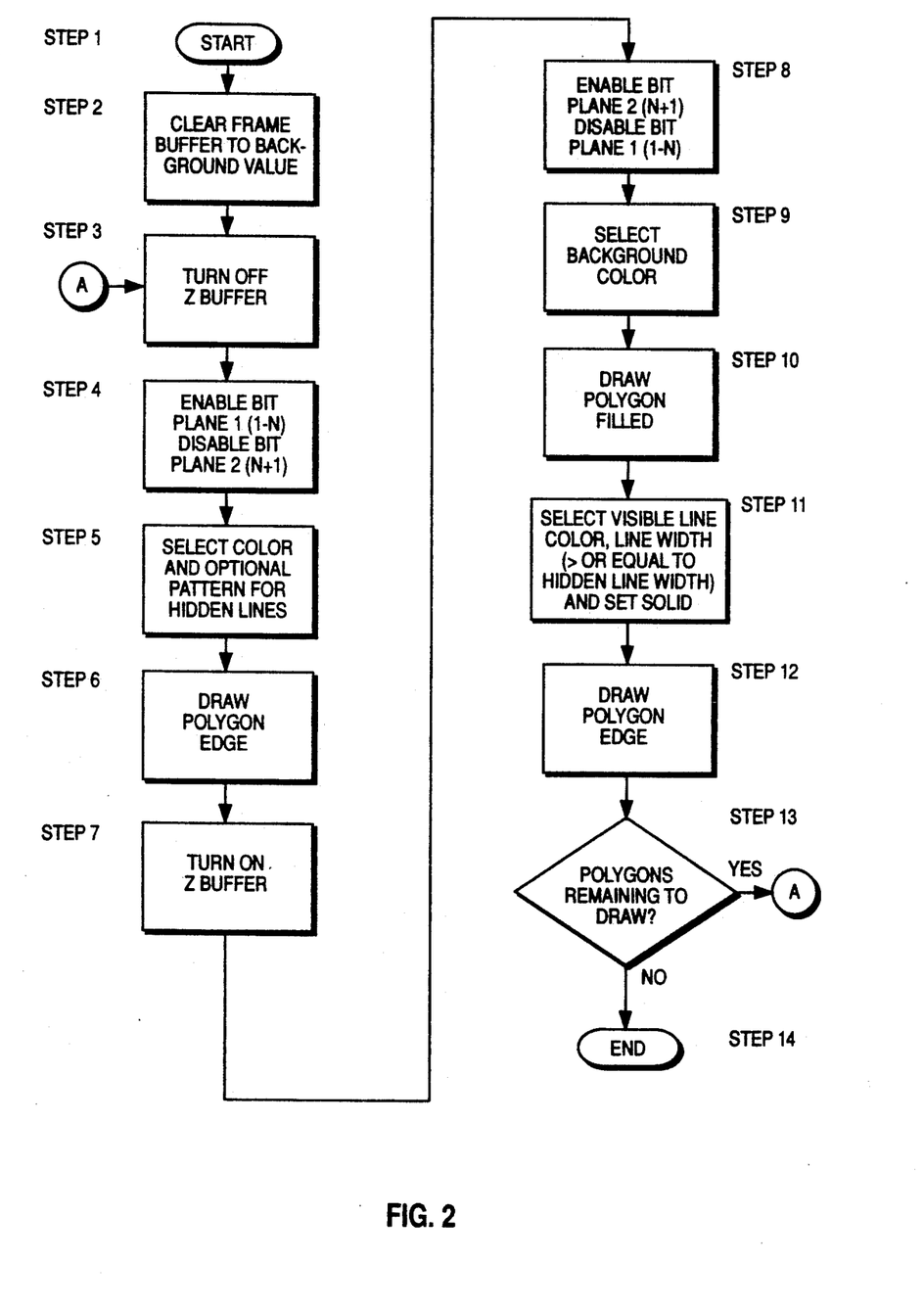
FIG. 2 is a flowchart showing the steps implemented by the present invention to draw each polygon with a single pass.

FIG. 2 is a flowchart of the steps implemented by the present invention to perform single pass polygon rendering. At step 1, the process is started and step 2 clears frame buffer 12 to the background color value which in the present invention corresponds to 0,0 (see FIG. 1). The z-buffer is then turned off at step 3 such that no depth testing will be performed, and lines get drawn irrespective of their visibility. The write mask 16 then enables bit plane one and disables bit plane two at step 4, thereby preventing bit plane two from being written to.

It should be noted that a two bit frame buffer has been described and will be used herein for exemplary purposes only. A two bit frame buffer 12 represents the minimum capacity required by the present invention. For example, an eight bit frame buffer is also contemplated by the present invention wherein bit plane 1 may correspond to bits 1-7 and bit plane 2 would represent bit 8. In this case, bit 8 would be the flag bit which determines whether the visible line color is to be written. The remaining 7 bits would be utilized to designate the hidden line and background colors. Therefore, step 4 enables the bit planes(s) corresponding to the hidden line and background colors (1—N) and disables the bit plane (N+1) corresponding to the visible line color. Subsequent examples will refer to a two bit plane frame buffer 12, but it should be understood that the present invention is not limited thereto.

The hidden line color and optional patterns (generally dashed or dotted lines) are then selected at step 5. For example, in FIG. 1 the hidden line color is identified by bits 0,1. Therefore, for those pixels corresponding to the hidden lines, bit plane one of frame buffer 12 becomes binary 1 and bit plane two, which has been disabled remains unaffected (but will be 0, except for those pixels corresponding to previously visible lines. Consequently, the color of frame buffer 12 is 0,1, or the hidden line color for those pixels corresponding to the hidden lines, while the remaining pixels stay the background color, unless they correspond to previously visible lines, in which case the pixels will still contain the visible line color. Step 6 draws the edges of the polygon being considered with the hidden line color and pattern as previously selected. Next, the z-buffer is turned on in step 7. Write mask 16 then enables bit plane two and disables bit plane one at step 8, in accordance with the previous discussion. The background color 0,0 is then selected from color map 10 (step 9).

Previously, bit plane two contained binary 0 and bit plane one contained binary one, i.e. (0,1). However, since it is disabled, bit plane one cannot be written with the binary 0, however bit plane two may be written to from color register 14 with a binary 0. Thus, those pixels corresponding to the hidden lines, having (0,1) in BP1 and BP2, respectively, are not painted with the background color (0,0) and remain the hidden line color (0,1). It should be noted that pixels not corresponding to hidden lines were previously set to the background color (step 2) and are unaffected by the disablement of bit plane one. However, pixels which had previously corresponded to visible lines will (if they are deeper than the filled polygon being drawn) revert to either background or hidden color, depending on their status before being drawn with the visible color. The interior region of the polygon being considered is then filled at step 10. Thus, it can be seen that hidden lines deeper into the display screen will not revert to the background color even though an overlaying polygon is being filled.

At step 11, the visible line color (1,0) is selected and placed in color register 14. Write mask 16 continues to disable bit plane one, but enables bit plane two for writing. Consequently, for those pixels associated with hidden lines, i.e. having binary 0 in bit plane two and binary 1 in bit plane one, binary 1 can be written into bit plane two, but bit plane one cannot be written to, because of the write mask 16. Therefore, binary 1 is now in bit plane two and binary 1 remains in bit plane one. Referring to color map 10 of FIG. 1 it can be seen that (1,1) also corresponds to the visible line color. Pixels associated with the background color and previously containing binary 0 in bit plane one and 0 in bit plane two of the frame buffer 12, become binary 1,0 (also the visible color) since bit plane two is enabled and binary 1 can be written thereto, and bit plane one is disabled. Thus, so long as bit plane two is enabled, and a binary one can be written thereto, the visible line color can always be displayed. Bit plane two is essentially a flag to display visible line color. That is, if bit plane two is on (binary 1) then visible line color is displayed (1,0; 1,1) and if bit plane two is off (contains binary 0) then either hidden lines (0,1) or background (0,0) colors are displayed.

Also, at step 11 the visible line width is selected which must be greater than, or equal to, the hidden line width (for the reason described below). The visible lines, or edges of the polygon being considered are then drawn at step 12. It can been seen that the pixels corresponding to both hidden lines and the background, which are obscured by any visible lines will now become the visible line color. Thus, with the z-buffer on, visible lines closer to a viewer take precedence over both hidden lines and background color therebeneath. It can be seen why the visible lines must be selected with a width greater than or equal to the hidden lines, since the visible lines will need to completely cover or obscure the hidden lines.

Step 13 determines whether there are any polygons contained within the image remaining to be drawn, and if so, the present invention returns to step 3 and repeats the previous process. If there are no polygons remaining, then the present invention continues to step 14 and ends.

The present invention protects hidden lines from being overwritten (steps 7-10) by polygons closer to a viewer, while ensuring the visibility of lines closer to the viewer (steps 11-12). That is, a polygon drawn closer to a viewer than a hidden line but farther from the viewer than a present visible line will have no effect on either the hidden or the visible line.

Subsequent to step 8 visible lines (1,0; 1,1) can always be written to frame buffer 12, due to the enablement of bit plane two, regardless of whether the hidden line (0,1) or background color (0,0) is currently in frame buffer 12. Further, assuming the existence of additional polygons the present invention provides that visible lines in a first polygon which subsequently become obscured by a closer polygon will become hidden lines. For example, assume the present invention has drawn its first polygon and is working on a second polygon which hides a portion of a visible line of the first polygon. The pixels corresponding to the visible lines in the first polygon may contain either (1,1) or (1,0) in frame buffer 12 since they may have originally been part of the hidden line or part of the background. The present invention then proceeds to process the second (overlapping) polygon and at step 4 enables BP1 and disables BP2. The hidden line color (0,1) is then chosen for the pixels of the second polygon, including those pixels corresponding to the obscured visible lines of the first polygon. Since BP1 is enabled and BP2 is disabled, frame buffer 12 will (after step 5) now contain visible line color (1,1) for all pixels associated with the visible line obscured by polygon two. This will be true regardless of whether (1,1) or (1,0) was originally contained in frame buffer 12. Next, BP2 is enabled and BP1 is disabled (step 8) and the background color (0,0) is selected at step 9. The pixels associated with the edges of the first polygon will now contain the hidden line color (0,1) since BP2 can be written to, but BP1 is disabled and remains binary one. The pixels associated with the visible lines (but not their hidden portions) of the first polygon will now contain the background color (0,0). The previously visible lines (of the first polygon) have thus become hidden lines. Further, at step 11, the background color (0,0) is selected, but cannot be written to the frame buffer 12 for those pixels containing the hidden line color. Again, BP2 is still enabled and BP1 is disabled such that binary zero may be written to BP2, but binary zero cannot be written to BP1. Therefore, frame buffer 12 for these pixels continues to contain the hidden line color (0,1). Consequently, it can been seen how: (1) the hidden lines are protected from being obscured by a polygon surface; (2) visible lines closer to a viewer remain solid; and (3) visible lines obscured by a subsequent polygon surface become hidden.

Figure 3:
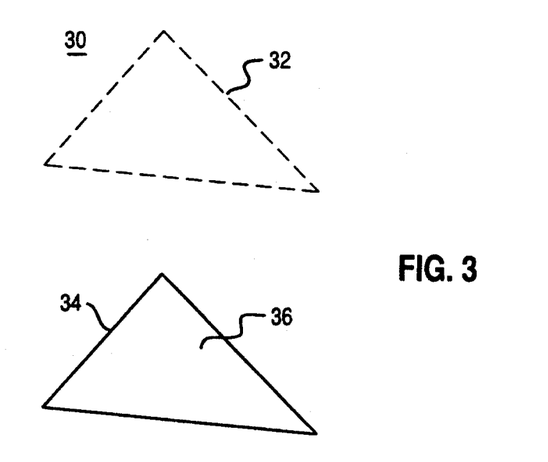
FIG. 3 illustrates a representative polygon in various stages of the single pass drawing process of the present invention.

Next, an example of the operation of the present invention will be described with reference to FIGS. 3 and 4. FIG. 3 shows a first polygon 30 with hidden lines 32, visible lines 34 and background color 36. Polygon 30, in this case a triangle, is the only polygon present in the image of FIG. 3. Thus, the present invention merely draws: the hidden lines 32 (step 6); background color (step 9); and visible line color (step 11), as previously discussed. Since no potential overlapping polygons exist in this example, it is not necessary to turn the z-buffer off and on, however this feature will be utilized with regard to step 6 discussed below.

For the example of the present invention discussed with reference to FIG. 4, assume polygon 30 has been drawn as shown in FIG. 3 and the present invention has now moved on to the next specific polygon to be drawn which is trapezoid 40. At step 9, the background color 42 of trapezoid 40 is selected. This color is represented in frame buffer 12 by (0,0), whereas visible lines 34 of polygon 30 are represented by either (1,1) or (1,0), depending on whether these pixels originally represented background or hidden lines. With the z-buffer off, BP1 is enabled and BP2 is disabled at step 4, the hidden line (0,1) color is selected (step 5) and the hidden line color is written to frame buffer 12 for the interior pixels of polygon 40, which correspond to the pixels representing visible lines 34. Thus, visible lines 34 (1,1) or (1,0) both become the visible line color (1,1). Next, the z-buffer is turned on and the present invention then realizes that polygon 30 is obscured by trapezoid 40. That is, the standard z-buffer test is performed whereby the pixels of a particular line or polygon "win," or take precedence, if they are determined to be closest to a viewer of display 22. BP2 is enabled and BP1 is disabled after step 8 and background color (0,0) is selected and written to frame buffer 12 (steps 9,10). Thus, the pixels corresponding to visible line 34 now contain (0,1) in their associated frame buffer, which is the hidden line color. Consequently, visible line 34 of polygon 30 now becomes hidden line 32, as shown in FIG. 4. The hidden lines (0,1) of polygon 40 remain hidden while the background color (0,0) is written to frame buffer 12 since BP1 is disabled and remains binary 1 and binary 0 is written to BP2, i.e. (0,1).

The present invention then selects the visible color (1,1) or (1,0) at step 11. The computer graphics system of the present invention may select either visible line color and all results will be exactly the same, due to the previous enablement of BP2 and disablement of BP1. The pixels associated with the hidden lines of trapezoid 40 then become visible line 44 since BP2 is enabled and either (1,1) or (1,0) will cause the hidden line color (0,1) to become visible line 44 (1,1). Therefore, polygon 40 is depicted as having visible lines (edges) and polygon 30 is now depicted with hidden lines 32 (see FIG. 4).

Figure 4:
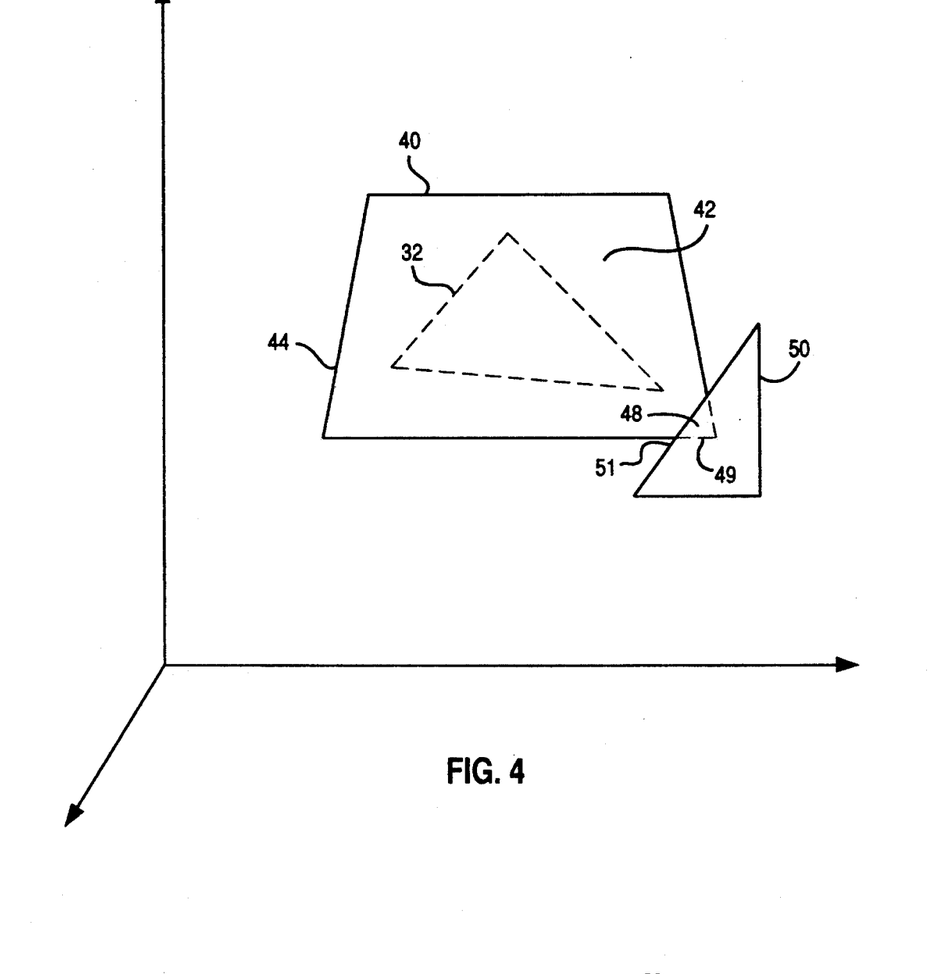
FIG. 4 shows hidden lines of a first polygon obscured by a second polygon and a third polygon obscuring the second polygon which is representative of the image seen by a viewer of the display system.

Continuing with this example, a third polygon 50 is shown in FIG. 4 and located so as to obscure a portion of polygon 40. Initially, triangle 50 is drawn (with the z-buffer off) with hidden line color (0,1). All pixels, corresponding to the edges of polygon 50, including a corner portion 48 of polygon 40 are written with hidden line color (0,1). The pixels of corner portion 48 which correspond to visible line color (1,1) or (1,0) all become visible line color (1,1), as previously discussed. At this point BP1 is enabled and BP2 is disabled. The z-buffer is then turned on and the present invention realizes that polygon 50 obscures corner portion 48 of trapezoid 40. The corner portion 48 is presently drawn in a visible line color, as discussed above. BP2 is enabled and BP1 is disabled and background color (0,0) is then selected for polygon 50. Corner portion 48 with visible line color (1,1) then becomes the hidden line color (0,1). The remainder of polygon 50 is then drawn with background color (0,0) and subsequently with the visible line color (1,1) or (1,0). The present invention then determines that no polygons are left to draw and ends. The resulting image is illustrated in FIG. 4 where corner portion 48 of trapezoid 40 is obscured by polygon 50, and trapezoid 40 covers polygon 30.

A more detailed example of the operation of the present invention will now be described with reference to FIG. 7.

Figure 7:
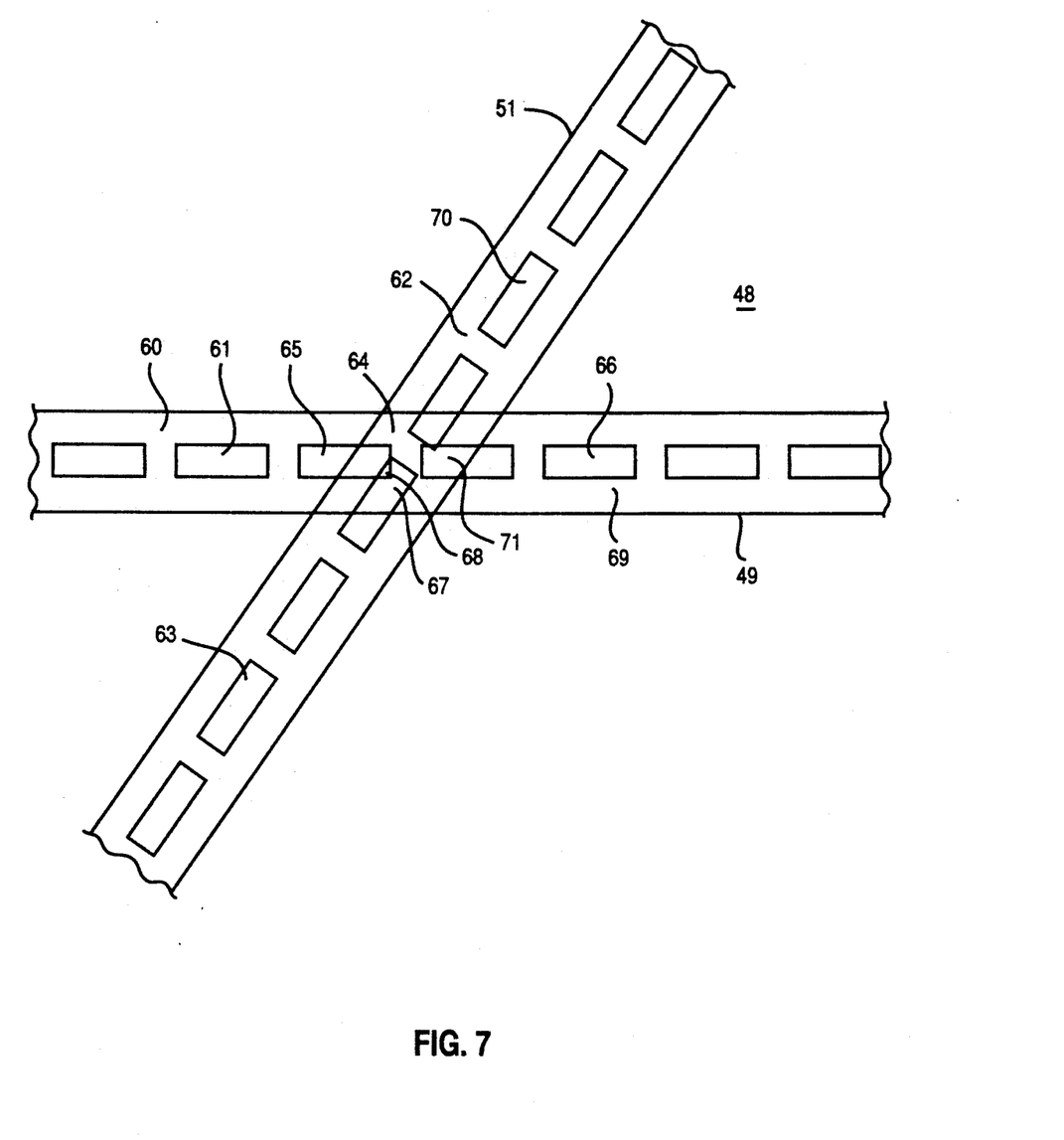
FIG. 7 illustrates line segments included in the second and third polygons of FIG. 4.

FIG. 7 illustrates the intersection of line segments 49 and 51 from polygons 40 and 50, respectively. Reference numeral 48 is the corner portion previously noted and is interior to both polygons 40, 50, and represents those interior pixels associated with this area. Consistent with the previous example, it is to be assumed that the polygon 50 obscures a portion of polygon 40 and therefore line segment 51 overlays segment 49.

Referring to the flowchart of FIG. 2 all pixels corresponding to polygon 40 have been cleared to the background color 0,0, (actually all pixels of display 22 have been cleared to 0,0 during processing of the first polygon 30). Therefore, those pixels represented by reference numerals 60, 61, 64, 65, 66, 67, 68, 69 and 71 are all initialized to 0,0 at step 2 (FIG. 2). The z-buffer 20 is turned off at step 3 and BP1 is then enabled and BP2 is disabled at step 4. Then line color 0,1 is selected from color map 10 at step 5 and the edges of polygon 40 are drawn with the hidden line color 0,1, at step 6. Subsequent to step 6, the pixels corresponding to the hidden lines (dashes) 61, 65, 66, 68 and 71 of segment 49 include 0,1 in their associated bit planes. However, those pixels 60, 69 not associated with the hidden line remain the background color 0,0. Thus, after step 6 has been performed, pixels 61, 65, 66 and 71 are the hidden line color 0,1 and all remaining pixels of polygon 40 are the background color 0,0.

Z-buffer 20 is then turned on at step 7 and BP2 is enabled and BP1 is disabled at step 8. Next, the background color of 0,0 is selected from color map 10 (step 9) and all interior pixels 48 of polygon 40 are written with background color 0,0. Thus, pixels 61, 65, 66, 68 and 71 contain hidden line color 0,1 remain hidden lines subsequent to step 10. The visible line color is then selected from color map 10 (step 11) it is previously noted, either 1,1 or 1,0 can be selected since BP1 is disabled. The edges of polygon 40 are written with the visible line color at step 11. Previous to step 11, pixels 60, 64, 69 (associated with the edge of polygon 40) contain 0,0 and pixels 61, 65, 66, 68 and 71 (associated with the hidden lines of polygon 40) contains 0,1. Thus, with BP1 disabled at step 12, pixels 60, 64 and 69 (0,0) become 1,0 and pixels 61, 65, 66, 68, 71 (0,1) become 1,1, both of which correspond to the visible line color. At step 13 it is determined that another polygon 50 is remaining to be processed and the method returns to step 3.

To summarize, line segment 49 is drawn with the visible line color and specifically, pixels 60, 64, 69 contain 1,0 and pixels 61, 65, 66, 68, 71 contain 1,1.

Continuing the processing of polygon 50, at step 3 z-buffer 20 is turned off and step 4 enables BP1 while disabling BP2. The hidden lines colors then selected (step 5) for those pixels 63, 67, 68, 70 corresponding to the dash (hidden lines) segment 51. With regard to pixels 63, 67, 70 they have previously been cleared to the background color 0,0 and now at step 6 these pixels become hidden line color 0,1, since BP1 is enabled to be written to by write mask 16. However, pixels 68 have previously been written to visible line color 1,1, as discussed above, and with BP2 disabled will remain visible line color 1,1.

Therefore, after step 6, pixels 62 remain background color 0,0 (since these pixels are not associated with the dashed, or hidden line), pixels 63, 67, 70 are now the hidden line color 0,1 and pixels 64 remain visible line color 1,0 and pixels 68 remain visible line color 1,1. At step 7 the z-buffer is turned on and step 8 enables BP2 and disables BP1. The background color 0,0 is selected from color map 10 (step 9). The interior of polygon 50 including pixels 48 is then drawn with the background color of step 10. Pixels 62 remain the background color 0,0 and with BP1 disabled, pixels 63, 67, 70 remain hidden line color 0,1. Pixels 68 remain visible line color 1,1. It should be noted that pixels 63, 67, 64, 68, 62 and 70 are unaffected by step 10, since only those pixels on the interior of polygon 50 are being drawn (i.e. those to the right of segment 51).

Therefore, pixels 66, which were previously visible line color 1,1 are now hidden line color 0,1 and pixels 69, previously visible line color 1,0, now become background color 0,0, since BP2 is enabled and BP1 is disabled. Consequently, that portion of line segment 49 to the right of segment 51 has now become a hidden line.

At step 11, the visible line color 1,0 or 1,1 is selected from color map 10. The edges of polygon 50 are then drawn with this visible line color at step 12. Pixels 63, 70, 67 (previously 0,1) all now become 1,1 since BP2 is enabled and written with binary one. Pixels 62 containing background color 0,0 are now written with visible line color 1,0 and pixels 67, 68, 71 previously written with visible line color 1,1 remain as such. Additionally, pixels 64 which were written visible line color 1,0 remain written with visible line color 1,0. Since no polygons remain to be processed the present invention proceeds to step 14 and ends.

It can be seen that after processing is complete, line segment 51 is a visible line. However, the portion of line segment 49 right of line segment 51 is hidden, whereas that part of segment 49 left of line segment 51 remains visible.

Figure 8:
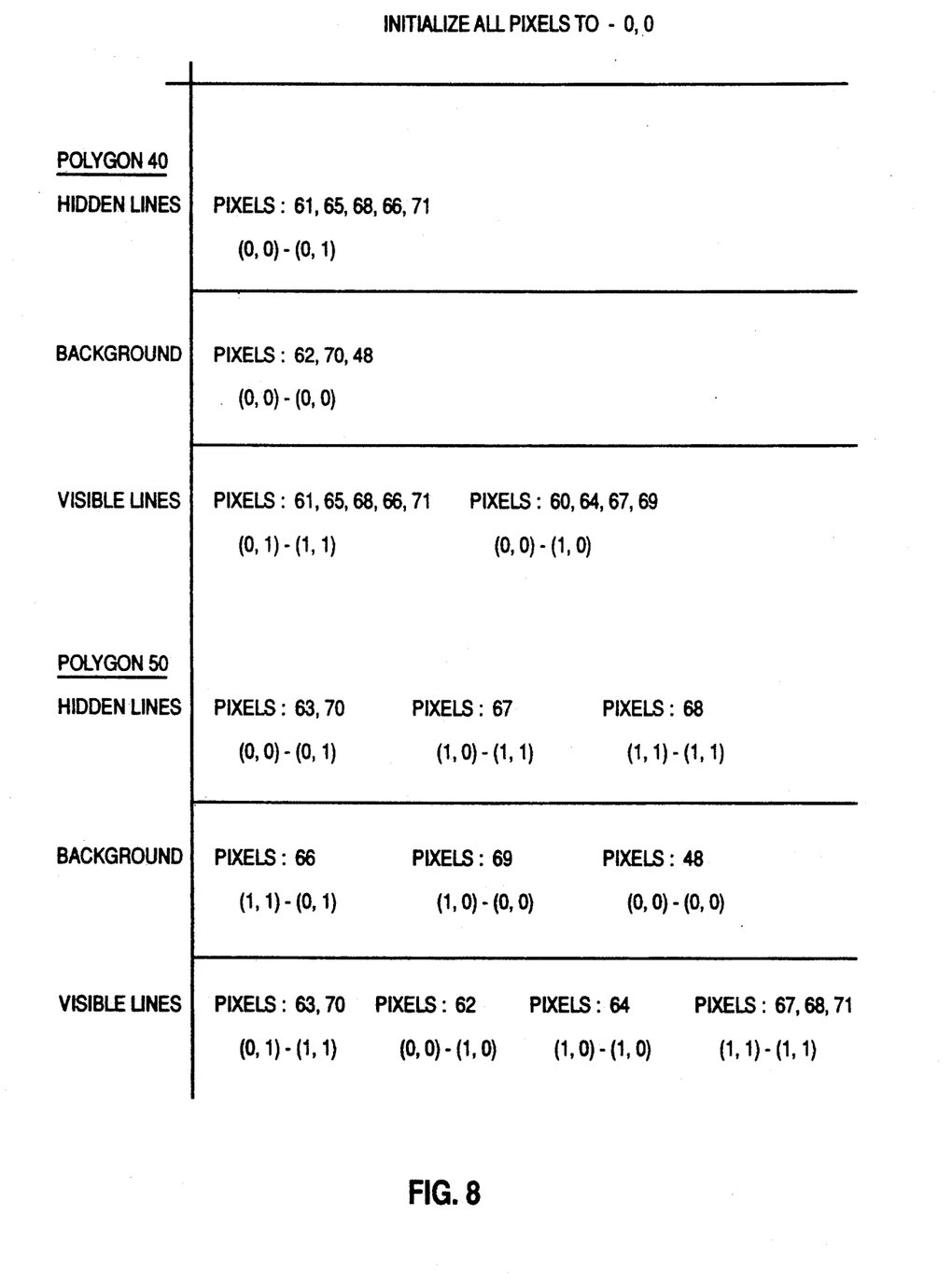
FIG. 8 is a table summarizing the results arrived at by applying the present invention to the pixels associated with the line segments of FIG. 7.

FIG. 8 represents a table summarizing the steps implemented by the present invention to reach the results described immediately above, with reference to FIG. 7. From the table of FIG. 8, it can be seen that all pixels are initially written with background color 0,0 (step 2 of FIG. 2). Pixels 61, 65, 66, 68 become the hidden line color 0,1, whereas pixels 62, 70, 71, 48 remain the background color 0,0. Further, pixels 61, 65, 68, 66, 71 which were hidden lines, become visible line color 1,1 and pixels 60, 64, 67, 69 which were background color 0,0, will become visible lines 1,0 during the drawing of the visible line as noted in FIG. 8. Thus, after processing polygon 40 pixels 60, 61 and 64–69 are the visible line color as noted by reference numeral 34 of FIG. 3, and pixels 62, 70 and 48 are the background color as noted by reference numeral 36 of FIG. 3.

Again referring to FIGS. 7 and 8, processing for polygon 50 is initiated. Pixels 63, 70 are background and become the hidden line color 0,1 during the drawing of the hidden line color for polygon 50, and pixels 67, 68, 71 which were visible lines remain as such. Pixels 66, previously the visible the line color, become the hidden line color 0,1, pixels 69 change from visible line 1,0 to background color 0,0 and pixels 48 remain the background color 0,0. At visible line drawing, pixels 63, 70 become visible lines 1,1 (previously hidden lines 0,1), pixels 62 become visible lines 1,0 (previously background color 0,0), pixels 64 becomes visible line color 1,0 (previously visible line 1,0) and pixels 67 remains visible line color 1,1.

Therefore, referring to the pixels of FIG. 7, after processing of polygon 50 is completed, pixels 60–68, 70 and 71 are visible lines, pixels 66 are hidden lines, pixels 48, 69 are the background color.

Thus the present invention manipulates entries to a color map 10, a z-buffer operation and the values which are to be masked from a multiple bit frame buffer in order to completely draw a polygon with a single path.

Thus, it can be seen that only a single pass, or set of operations, is required for each specific polygon being drawn. The present invention allows each polygon within an image to be distinctly processed in a single pass without the necessity of going back and making additional passes. Thus, the present invention provides an efficient means of drawing polygons in a computer graphics system.

Although certain preferred embodiments have been shown and described, it should be understood that many changes and modifications may be made therein without departing from the scope of the appended claims.

What is claimed is:

1. A system for drawing on a display monitor, in one pass through data associated with a plurality of polygons in a three dimensional computer graphics system, comprising:
   means for storing, in a color map, predetermined colors to represent hidden line colors, visible line colors and background colors for said plurality of polygons when said polygons are drawn on said display;
   controllable z-buffer means that is turned off when a hidden line is being drawn and then turned on when a visible line or said background is currently being drawn such that said z-buffer will determine a depth relationship of said plurality of polygons to allow said polygons to be represented by said hidden line color, said visible line color or said background color from said color map;
   multiple bit frame buffer means for storing information associated with said pixel contained on said display monitor; and
   means for disabling a first bit of said multiple bit frame buffer means when said z-buffer is turned off, and for, disabling at least one other bit when said z-buffer is turned on.

2. A system according to claim 1 wherein said means for storing is a color map having at least fifty percent thereof loaded with said visible line color.

3. A system according to claim 2 wherein said means for disabling is a user modifiable write mask capable of alternately enabling a first bit and concurrently disabling at least a second bit of said multiple bit frame buffer.

4. A method for drawing, in one pass through data associated with a plurality of polygons on a display of a three dimensional computer graphics system, having a z-buffer capable of being turned off and a multiple bit frame buffer, said method comprising the steps of:
   storing, in a color map, predetermined colors for hidden line colors, visible line colors and background colors for said plurality of polygons;
   controlling a state of said z-buffer by turning the z-buffer off when a hidden line is being drawn and then on when a visible line or background is being drawn such that said z-buffer will determine a depth relationship between said plurality of polygons to allow said polygons to be represented by said predetermined colors;
   alternately enabling a first bit and concurrently disabling at least a second bit of said multiple bit frame buffer based upon the state of said z-buffer such that selected ones of said predetermined colors can be written to said frame buffer based upon the depth relationship of said polygons; and
   drawing said hidden lines, visible lines and background for said plurality of polygons on said display based upon the colors written to said frame buffer.

5. A method according to claim 4 wherein said step of storing comprises initializing all pixels associated with said display monitor such that each of said pixels are the background color.

6. A method according to claim 5 wherein said step of controlling the state of said z-buffer comprises the steps of:
   turning off said z-buffer when said hidden lines are being drawn; and
   turning on said z-buffer when said background and said visible lines are being drawn.

7. A method according to claim 6 wherein said step of alternately enabling comprises the steps of:
   disabling a first bit of said multiple bit frame buffer when said hidden lines are being drawn; and
   enabling said first bit and disabling at least one other bit when said background and said visible lines are being drawn.

8. A method according to claim 7 further comprising the steps of:
   selecting a first polygon to be drawn from said plurality of polygons;
   determining whether all of said plurality of polygons have been drawn; and
   drawing successive ones of said plurality of polygons until all of said plurality of polygons have been processed.

9. A method for drawing, a plurality of polygons on a display of a computer graphics system having a z-buffer and a multiple bit frame buffer, said method comprising the steps of:
   storing, in a color map, predetermined colors for hidden line colors, visible line colors and background colors for said plurality of polygons and initializing all pixels associated with said display to the background color;
   controlling a state of said z-buffer by turning the z-buffer off when hidden lines are being drawn, and turning the z-buffer on when visible lines and background are being drawn such that said z-buffer will determine a depth relationship between said plurality of polygons;
   disabling a first bit of said multiple bit frame buffer when said z-buffer is turned off and said hidden lines are being drawn;
   enabling said first bit and disabling at least one other bit when said z-buffer is turned on and said background and said visible lines are being drawn; and
   drawing said hidden lines, said visible lines and said background for said plurality of polygons on said display with respective said predetermined colors.

10. A method according to claim 9 further comprising the steps of:
    selecting a first polygon to be drawn from said plurality of polygons;
    determining whether all of said plurality of polygons have been drawn; and
    drawing successive ones of said plurality of polygons until all of said plurality of polygons have been processed.

* * * * *